A. ARATO.
STEERING GEAR FOR TRAILERS.
APPLICATION FILED JUNE 1, 1920.
1,374,175. Patented Apr. 12, 1921.
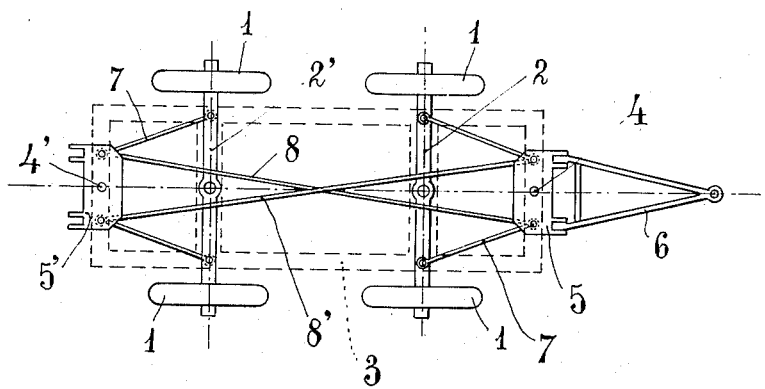
Inventor:
Achille Arato
By Lawrence Langner
Attorney.

UNITED STATES PATENT OFFICE.

ACHILLE ARATO, OF TURIN, ITALY, ASSIGNOR TO FERRUCCIO BOTTA, OF TURIN, ITALY.

STEERING-GEAR FOR TRAILERS.

1,374,175. Specification of Letters Patent. Patented Apr. 12, 1921.

Application filed June 1, 1920. Serial No. 385,733.

*To all whom it may concern:*

Be it known that I, ACHILLE ARATO, a subject of the King of Italy, and resident of Turin, Italy, have invented certain new and useful Improvements in Steering-Gears for Trailers, of which the following is a specification.

This invention relates to four wheeled trailer vehicles of the kind having wheels mounted on pivoted axles or carriages or, generally speaking, on steering parts, and provided with steering means for causing the wheels to follow the track of the wheels of the tractor, or of the preceding vehicle, during the hauling.

The object of this invention is to provide an improved arrangement for transmitting to the trailer wheels the deviations of the coupling between the trailer and the preceding vehicle or tractor, said arrangement being less complicated and cumbersome than the arrangements at present in use.

The figure of the annexed drawing shows in plan a diagram of an embodiment of this invention.

As shown in the drawing the four wheels 1 of the vehicle are mounted in pairs at the ends of axles 2 and 2', each adapted to rotate around its vertical central axis with regard to the frame 3.

A movable member or yoke 5—5' is pivoted, at 4—4' respectively, to the center of each end piece of the vehicle frame and apart from the pivot point of the adjacent axle, and each of said members 5—5' is adapted to be connected with a coupling 6 which is hinged to said member to rock around a horizontal axis so as to be free for moving in vertical direction with regard to member 5 while said coupling and member are rigid during rotation in a horizontal plane.

Each member 5—5' is connected with the adjacent pivoted axle 2—2' by means of rods 7, and the points of connection of said rods 7 with the members 5—5' and axles 2—2' respectively are spaced apart to different extents from the respective centers of rotation of said parts, the ratio between the distance from pivot pins 4—4' to the pivot points of bars 7 on said members 5—5' and the distance from the pivot points of the axles 2—2' to the pivot points of bars 7 on the same axles being the same ratio as required between the deviations of members 5—5 and axles 2—2' for the purpose of causing the wheels of the trailer to follow the track of the wheels of the tractor or preceding car. This ratio depends upon the particular construction of the cars, that is upon the distance between the axles and the distance between the head-stocks of the subsequent vehicles.

The members 5—5' are interconnected by means of crossing rods 8—8' which are pivoted on said members at points equally spaced from the pivot points 4—4' of said members on the vehicle frame.

By the described construction the deviations imparted to the member 5 by the coupling 6 are transmitted under the required ratio and in the same direction to the adjacent axle 2 and the same deviations are transmitted to the same extent but in the opposite direction to the other member 5'; this member 5' moves the adjacent axle 2' through the proper angle and in the opposite direction with regard to axle 2 so that all the wheels of the trailer car take up the required position for correct steering.

It is to be understood that the trailer wheels may be mounted on pivoted carriages or on other steering parts of any kind instead of being mounted on pivoted axles as illustrated in the above described embodiment.

The described construction allows of obtaining the correct steering of the several cars of a road train and of connecting together said cars whatever may be the ends of the cars which are in front of each other when the train is formed.

In the construction according to this invention the swinging members 5 and 5' connected with the couplings 6 are located at the ends of the car so that the couplings pivoted to them may move freely in a vertical direction. Furthermore said members may have a small size so that they do not require the provision of guiding means for their swinging motion.

What I claim as my invention and desire to secure by United States Letters Patent is:

1. In a trailer having wheels mounted on steering parts, a member pivoted to swing at each end of the trailer around a vertical axis distinct from the axis of rotation of said steering parts, means for connecting either of said members with a tractor, and means interconnecting said steering parts and swinging end members, said means comprising ties transmitting the deviations of said swinging member connected with the tractor to the steering parts carrying the adjacent wheels in the same direction and under a reduced ratio, and to the steering parts carrying the other wheels in the opposite direction and under the same reduced ratio.

2. In a trailer having pivoted axles, a pair of wheels mounted on each axle, a member pivoted to swing around a vertical axis at each end of the trailer, means for connecting either of said members with a tractor and means interconnecting said axles and swinging end members, said means comprising ties transmitting the deviation of said swinging member connected with the tractor to the adjacent axle in the same direction and under a reduced ratio, and to the other axle in the opposite direction and under the same reduced ratio.

3. In a trailer having pivoted axles, a pair of wheels on each axle, a member pivoted to swing around a vertical axis at each end of the trailer, means for connecting either of said swinging members with a tractor, ties connecting each swinging member with the adjacent axle, the pivot points of said ties on the associated swinging member and axle being located at the same side of and at different distances from the respective centers of rotation of said member and axle, and ties interconnecting said swinging members, the pivot points of the last named ties on said swinging members being located at the opposite sides of and at the same distance from the centers of rotation of said swinging members.

4. In a trailer having wheels mounted on steering parts, a member pivoted to swing at each end of the trailer around an axis distinct from the axis of rotation of said steering parts, a member pivoted around a horizontal axis on either of said swinging members and adapted to be connected with a tractor, and means interconnecting said steering parts and swinging end members, said means comprising ties transmitting the deviations of the swinging member connected with the tractor to the steering parts carrying the adjacent wheels in the same direction and under a reduced ratio, and to the steering parts carrying the other wheels in the opposite direction and under the same reduced ratio.

5. In a trailer having wheels mounted on steering parts, a member pivoted to swing at each end of the trailer around a vertical axis distinct from the axis of rotation of said steering parts, means for connecting either of said members with a tractor, cross ties connecting together said swinging members, each tie being pivoted at opposite sides of and at the same distance from the centers of rotation of said swinging members, and ties connecting each swinging member with the steering parts carrying the adjacent wheels, the last-named ties being pivoted on said swinging members and parts at different distances from the respective centers of rotation.

Signed at Turin, Italy, this 11 May, 1920.

ACHILLE ARATO